United States Patent
Murray et al.

(10) Patent No.: US 11,620,354 B2
(45) Date of Patent: Apr. 4, 2023

(54) SYSTEM AND METHOD FOR PROTECTED PROXY DESIGN FOR DYNAMIC API SCANNING SERVICE

(71) Applicant: Oracle International Corporation, Redwood Shores, CA (US)

(72) Inventors: Ryan Murray, Seattle, WA (US); Ken Tang, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 643 days.

(21) Appl. No.: 16/665,444

(22) Filed: Oct. 28, 2019

(65) Prior Publication Data

US 2020/0285686 A1 Sep. 10, 2020

Related U.S. Application Data

(60) Provisional application No. 62/814,687, filed on Mar. 6, 2019, provisional application No. 62/814,688, filed on Mar. 6, 2019.

(51) Int. Cl.
| | | |
|---|---|---|
| *G06F 16/955* | (2019.01) | |
| *G06F 21/31* | (2013.01) | |
| *G06F 9/54* | (2006.01) | |
| *G06F 9/46* | (2006.01) | |
| *H04L 9/40* | (2022.01) | |

(52) U.S. Cl.
CPC .......... *G06F 16/9558* (2019.01); *G06F 9/466* (2013.01); *G06F 9/541* (2013.01); *G06F 21/31* (2013.01); *H04L 63/08* (2013.01); *H04L 63/1433* (2013.01)

(58) Field of Classification Search
CPC ...... G06F 16/9558; G06F 9/466; G06F 9/541; G06F 21/31; G06F 2209/541; G06F 9/54; G06F 2221/034; G06F 21/577; H04L 63/08; H04L 63/1433; H04L 63/0807
See application file for complete search history.

(56) References Cited

U.S. PATENT DOCUMENTS

| | | |
|---|---|---|
| 6,898,711 B1 | 5/2005 | Bauman |
| 8,997,196 B2 | 3/2015 | Kariv |
| 9,930,058 B2 | 3/2018 | Carpenter |
| 10,129,344 B2 | 11/2018 | Pogrebinsky |
| 10,339,299 B1 | 7/2019 | Magnuson |
| 10,514,837 B1 | 12/2019 | Li |
| 11,184,374 B2 | 11/2021 | Shu |
| 2008/0313005 A1 | 12/2008 | Nessland |

(Continued)

OTHER PUBLICATIONS

United States Patent and Trademark Office, Office Communication dated Mar. 2, 2022 for U.S. Appl. No 16/665,485, 21 pages.

(Continued)

*Primary Examiner* — Syed A Roni
(74) *Attorney, Agent, or Firm* — Tucker Ellis LLP

(57) ABSTRACT

Described herein are systems and methods that provide a mechanism to proxy and protect HyperText Transport Protocol/Transport Layer Security (HTTP/TLS) redirection attempts. This technique mirrors an intended target request with a new request, never forwarding the original request from the scanner. This action provides protection to the end target as only key elements of the HTTP request are used while crafting a new HTTP request.

17 Claims, 10 Drawing Sheets

(56) References Cited

U.S. PATENT DOCUMENTS

| | | |
|---|---|---|
| 2011/0307947 A1 | 12/2011 | Kariv |
| 2013/0086689 A1 | 4/2013 | Laveriere-Papineau |
| 2014/0123295 A1* | 5/2014 | Kuykendall .......... G06F 21/577 |
| | | 726/25 |
| 2016/0050225 A1 | 2/2016 | Carpenter |
| 2017/0006119 A1 | 1/2017 | Pogrebinsky |
| 2018/0115523 A1* | 4/2018 | Subbarayan ........ H04L 63/0281 |
| 2020/0120118 A1 | 4/2020 | Shu |
| 2020/0287928 A1 | 9/2020 | Murray |
| 2022/0038902 A1 | 2/2022 | Mueck |
| 2022/0166626 A1 | 5/2022 | Madisetti |

OTHER PUBLICATIONS

United States Patent and Trademark Office, Office Communication dated Sep. 9, 2021 for U.S. Appl. No. 16/665,485, 17 pages.
United States Patent and Trademark Office, Notice of Allowance and Fee(s) due dated Sep. 21, 2022 for U.S. Appl. No. 16/665,485, 11 pages.
United States Patent and Trademark Office, Office Communication dated Aug. 1, 2022 for U.S. Appl. No. 16/665,485, 4 pages.

* cited by examiner

API Scan Job 700

| Project 703 | Endpoint 705 | Status 710 |
|---|---|---|
| A101 | domain.cloud.com | queued |
| A102 | domain2.cloud.com | queued |
| A103 | domain3.cloud.com | running |
| A104 | domain4.cloud.com | pending |

*FIGURE 7*

SYSTEM AND METHOD FOR PROTECTED PROXY DESIGN FOR DYNAMIC API SCANNING SERVICE

CLAIM OF PRIORITY AND CROSS REFERENCE TO RELATED APPLICATIONS

This application claims priority to U.S. Provisional Patent Application entitled "SYSTEM AND METHOD FOR PROTECTED PROXY DESIGN FOR DYNAMIC API SCANNING SERVICE", Application No. 62/814,687, filed on Mar. 6, 2019, and to U.S. Provisional Patent Application entitled "SYSTEM AND METHOD FOR ABSTRACTED ANALYSIS SYSTEM DESIGN FOR DYNAMIC API SCANNING SERVICE", Application No. 62/814,688, filed on Mar. 6, 2019, is related to U.S. patent application entitled "SYSTEM AND METHOD FOR ABSTRACTED ANALYSIS SYSTEM DESIGN FOR DYNAMIC API SCANNING SERVICE", filed concurrently herewith, each of which applications are incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This disclosure relates generally to security and vulnerability threats to endpoints of services, systems, devices, tools . . . etc. More specifically, the disclosure provides systems and methods for a protected proxy design for a dynamic application programming interface (API) scanning service.

BACKGROUND

Endpoints (public and private) of websites, tools, devices, and other networked services can be vulnerabilities for companies and other entities. API scanners are designed to detect vulnerabilities in any API, including web-connected devices such as mobile backend servers, internet-of-things (IoT) devices, as well as any RESTful APIs.

REST (Representational State Transfer) is an architectural style that can be used to communicate with web services. In many ways REST has a lot in common with protocols such as SOAP (Simple Object Access Protocol); it is used as a communication mechanism between two applications, or between an application and an online service. Many mobile web applications communicate with a RESTful API at the backend to communicate with the online service.

SUMMARY

Described herein are systems and methods for abstracted analysis system design for a dynamic API scanning service. An exemplary method for a protected proxy for a dynamic API scanning service can provide, at a computer comprising a microprocessor and a memory, a cloud-based infrastructure comprising an autonomous transaction processing (ATP) database service and a redirect service. The method can further provide a user portal and a database store. The method can receive, at the ATP database service, a scan project request, the scan project request being targeted to an endpoint of a client resource. The method can start, by the ATP database service, one or more containerized API scanners targeted a unique identifier created by the redirect service. The method can mirror, by the redirect service, one or more requests from the one or more containerized API scanners, the mirrors being sent to the target endpoint.

A dynamic API scanning service can be provided by abstracting underlining security scanning techniques and configurations. This presents a normalized view to users of the service. Both input parameters and scan output data is abstracted from users, and is driven based on logic in the service. By providing this simplified view, users can quickly, and without prior security scanning knowledge, use this service to measure their security exposure and mitigate as needed.

In accordance with an embodiment, the systems and methods described here that provide a mechanism to effectively proxy and protect HTTP/TLS (HyperText Transfer Protocol/Transport Layer Security) redirection attempts. This technique is a sub component of the Dynamic API Scanning Service and breaks from standard patterns and is how the abstraction from the security scanners is accomplished. The resulting scanner is unaware that a man-in-the-middle is present. Furthermore, this technique mirrors the intended target request with a new request, never forwarding the original request from the scanner. This action provides protection to the end target as only key elements of the HTTP request are used while crafting a new HTTP request.

BRIEF DESCRIPTION OF THE FIGURES

FIG. 7 shows a screenshot of an exemplary user portal, in accordance with an embodiment.

DETAILED DESCRIPTION

Businesses expose REST APIs to the public internet to service many different types of customer requests. This is a commonly attacked threat vector by malicious actors that aim to hurt the business. The Dynamic API Scanning Service (DASS) provides clients with proactive scans that help identify potential vulnerabilities before they are exposed.

In accordance with an embodiment, the systems and methods described herein provide a simplified API scanning service by abstracting underlining security scanning techniques and configurations. This presents a normalized view to users of the service. Both input parameters and scan output data is abstracted from users, and is driven based on logic in the service. By providing this simplified view, users can quickly, and without prior security scanning knowledge, use this service to measure their security exposure and mitigate as needed.

In accordance with an embodiment, users of DASS can be presented with a web based frontend, which can comprise a list of available security scanners. The scanner names are abstracted as well as any configuration options to the scanners. A target endpoint is provided by the user, and after approval, any scans may be run against that endpoint. The service goal is to ensure user's endpoints, created as a result of custom web applications or third party applications, are secure and not vulnerable to attack techniques.

In accordance with an embodiment, in addition to abstracting the configuration and specific details of the security scanners, the output data is automatically altered and normalized. Without normalizing, consolidating and annotating security scanner output data, most end users are not able to make scene or use of the data collected by scanners. The abstracted design for the Dynamic API Scanning Service removes the requirement to be a security expert to understand these findings by outputting a simple list of findings and actionable remedies to discovered vulnerabilities.

Figure 1:
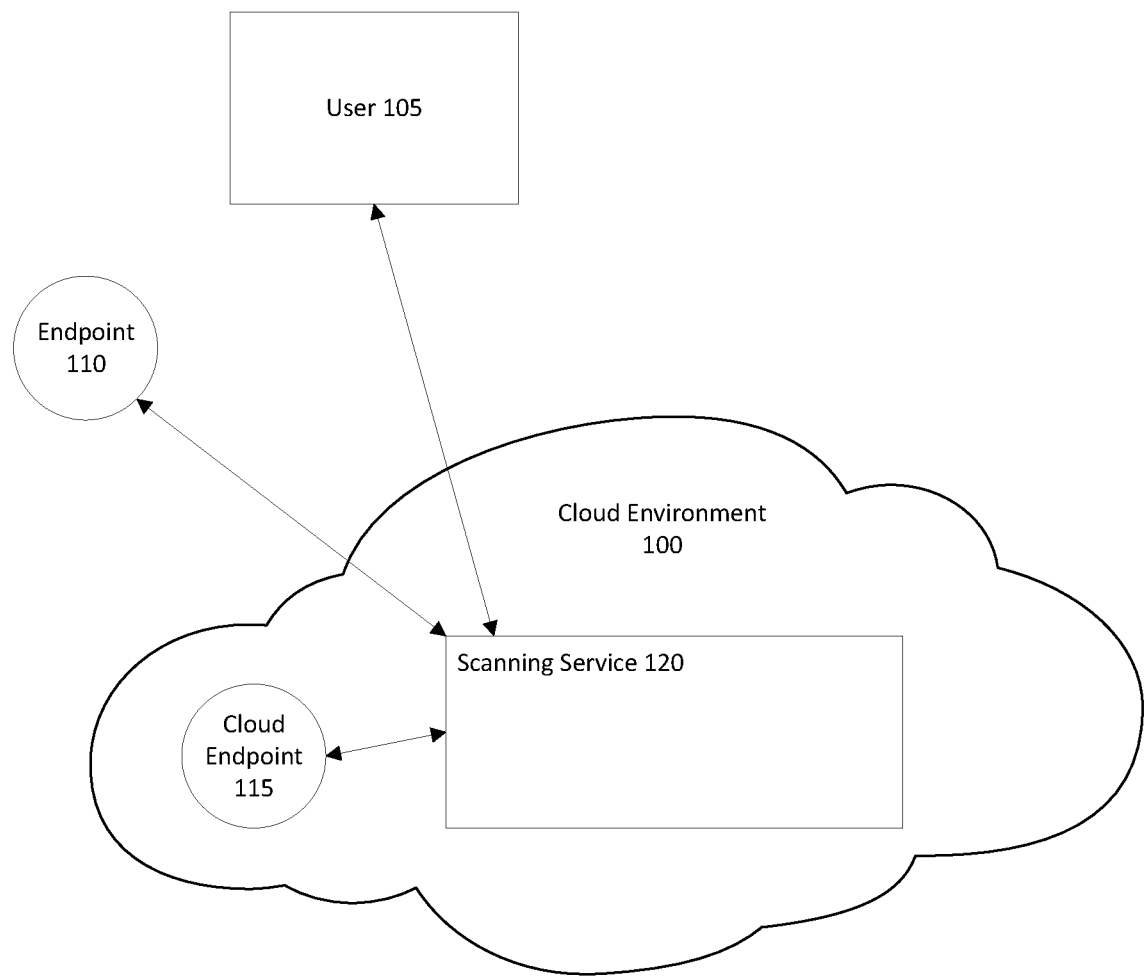
FIG. 1 shows an environment for an abstracted analysis system design for a dynamic API scanning service, in accordance with an embodiment.

FIG. 1 shows an environment for an abstracted analysis system design for a dynamic API scanning service, in accordance with an embodiment.

In accordance with an embodiment, within a cloud environment (e.g., Oracle Cloud Infrastructure), a scanning service 120 can be provide. A user 105 can interact with the scanning service to instruct the scanning service to scan one or more exposed endpoints (e.g., REST APIs).

In accordance with an embodiment, the scanning service 120 can provided abstracted security scanning techniques and configurations. This presents a normalized view to users of the service. The user can provide input parameters and scan output data, which is abstracted from users. By providing this simplified view, users can quickly, and without prior security scanning knowledge, use this service to measure their security exposure and mitigate as needed.

In accordance with an embodiment, the end points 110 and 115, which are associated with the user 105, can be external to the cloud environment, or can be within the cloud environment.

In accordance with an embodiment, when interacting with the scanning service, a user can be presented with a frontend (e.g., web-based). This front end, in addition to accepting input information from the user, such as task name and target end point, can additionally include a list of available security scanners. In alternative embodiments, such lists are not presented to the user, and instead the users can be presented with recommended scanners, wherein each recommended scanner can comprise one or more security scanners.

In accordance with an embodiment, scanner names can be abstracted as well as the configuration options of the scanners. A target endpoint is provided by the user, and after approval, any scans may be run against that endpoint. The service goal is to ensure user's endpoints, created as a result of custom web applications or third party applications, are secure and not vulnerable to attack techniques.

Figure 2:
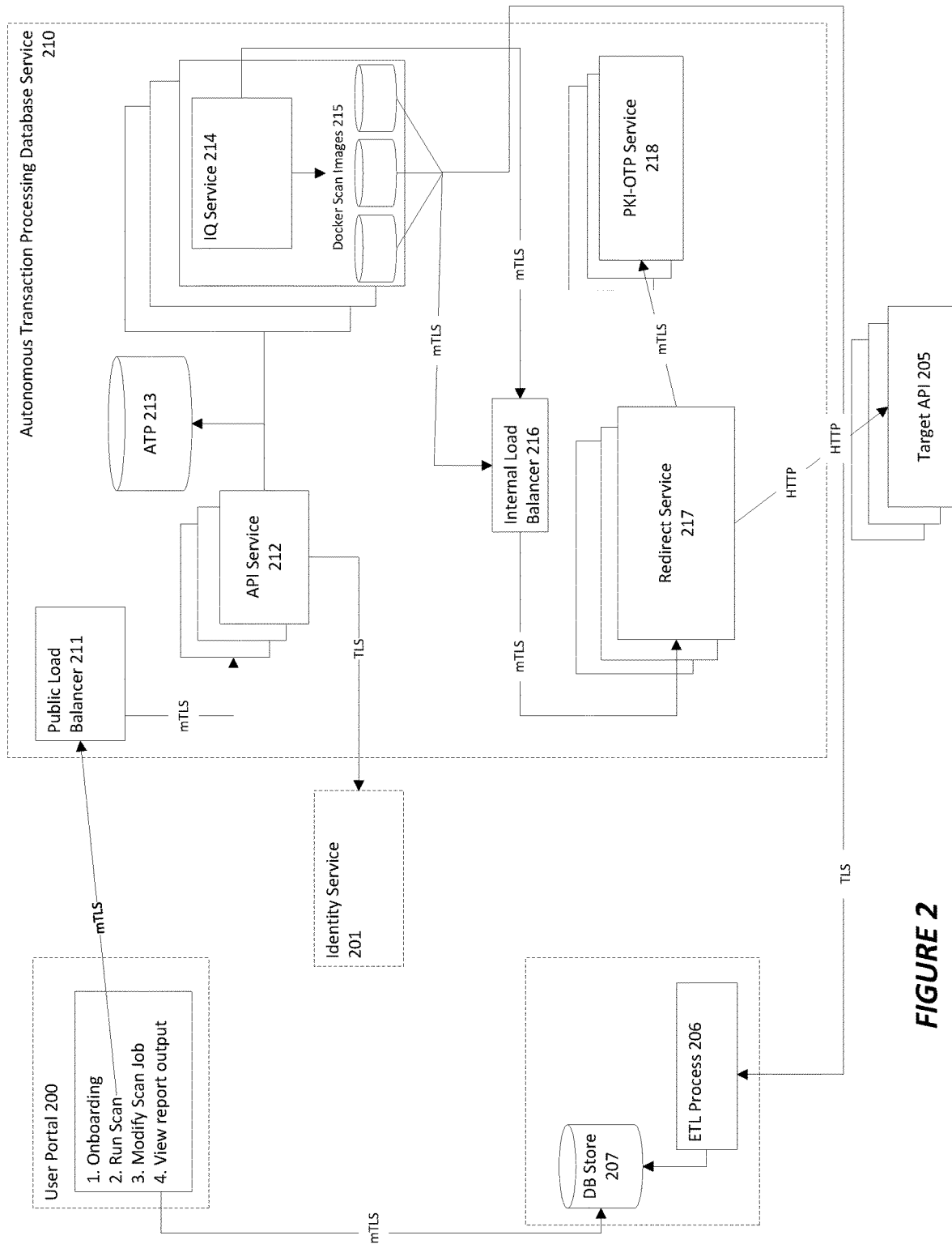
FIG. 2 shows a system for an abstracted analysis system design for a dynamic API scanning service, in accordance with an embodiment.

FIG. 2 shows a system for an abstracted analysis system design for a dynamic API scanning service, in accordance with an embodiment.

In accordance with an embodiment, the systems and methods provided herein allows customers, whether internal or external, to utilize a tool in order to scan accessible endpoints. This allows the use of multiple, open sourced API scanners, and to be completely abstracted from the customer.

In accordance with an embodiment, users can visit a user portal 200 where information can be ingested/on boarded. This information can include, for example, the address of the endpoint that the user desires to be scanned, a job name, and a selection of scanners (either picked individually, picked a group of recommended scanners, and/or have automatic selection provided) are to be run.

In accordance with an embodiment, once a job has been entered, the scan can be performed. The inputted information is passed, via, e.g., Java database connectivity (JDBC), into an autonomous transaction processing (ATP) database service 210, where it can be received first at a public load balancer 211. From there, the job is passed to one or more API services, which can verify credentials associated with the job at an identity serviced 201. Once verified, the one or more API services can load/order the requested scan jobs at the ATP database 213.

In accordance with an embodiment, the IQ service 214 can pick up, via, e.g., JDBC, jobs from the ATP database. The IQ service can then normalize all the inputs received from the user portal, and can create and run one or more containerized scan images 215 (e.g., via a Docker container service). The IQ service can utilized an internal load balancer 216 prior to utilizing the redirect service 217 for running the containerized scans. The redirect service can utilize a PKI-OTP (public key infrastructure—one time pass) service 218 in running the containerized scans. As well, the redirect service can map/mirror to the target API 205.

In accordance with an embodiment, the IQ service utilizes a container service to create a container for each scan, run the scan, and then destroy the container once the scan is completed.

In accordance with an embodiment, the IQ service as a service can create abstracted modules for each of the scanners (e.g., RESTfuzz, ZAP, or other scanning tools). These abstracted modules maps all custom settings of the scanners and normalize the scanners into the cloud service in which the scanners are to be run (e.g., Oracle Cloud Infrastructure). In this way, any client/end user does not have to do anything beyond hitting a button to run the service. This is all run within the cloud service.

In accordance with an embodiment, the endpoints that users can select to be scanned can be located anywhere, and do not necessarily have to be within the cloud service. At the user portal, a user can pick and choose (potentially) which scans to run on their endpoints. On the back end, the scans are normalized against the cloud infrastructure that hosts the scanning service. The scans are run in a containerized service. The scanners are preconfigured container images (e.g., Docker) that are custom and normalized to the cloud infrastructure. In an embodiment, for example, the IQ service picks up a job from the ATP database, and when it has a scan job, it picks the Docker image based on the type of scan it needs to run. A container is started for the scan, based on the job, and when the job is over, the container is discarded. The output of the scanner then goes into the extract, transform, load (ETL) process. Because each scanner has a completely different output characteristics and formats, it is useful for the ETL process to normalize the results such that they can be presented in an easy-to-read, normalized list to the end user. The output is then pushed into an output portal (e.g., DB Store 207).

In accordance with an embodiment, once the scans have been completed, the raw results can be transmitted and loaded at an extract-transform-load process 206, where the results can be normalized and started at a database store 207. It is at this database that the user can access, via the user portal 200, the normalized results of the scans.

Figure 3:
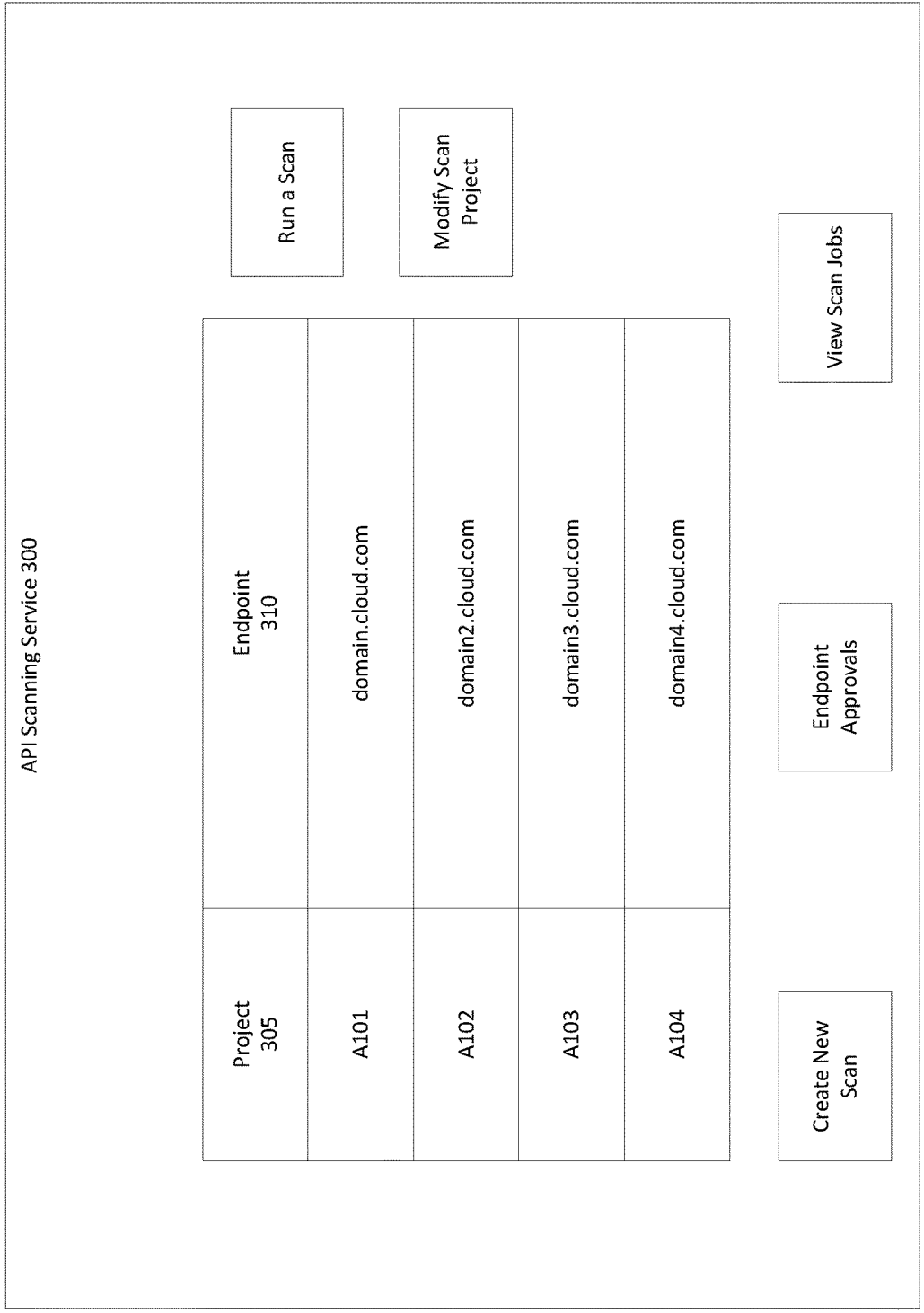
FIG. 3 shows a screenshot of an exemplary user portal, in accordance with an embodiment.

FIG. 3 shows a screenshot of an exemplary user portal, in accordance with an embodiment.

In accordance with an embodiment, the user portal shown in the figure can show an API scanning service 300 that displays a number of projects 305. Each of the projects can be directed to one or more endpoints 310.

Figure 4:
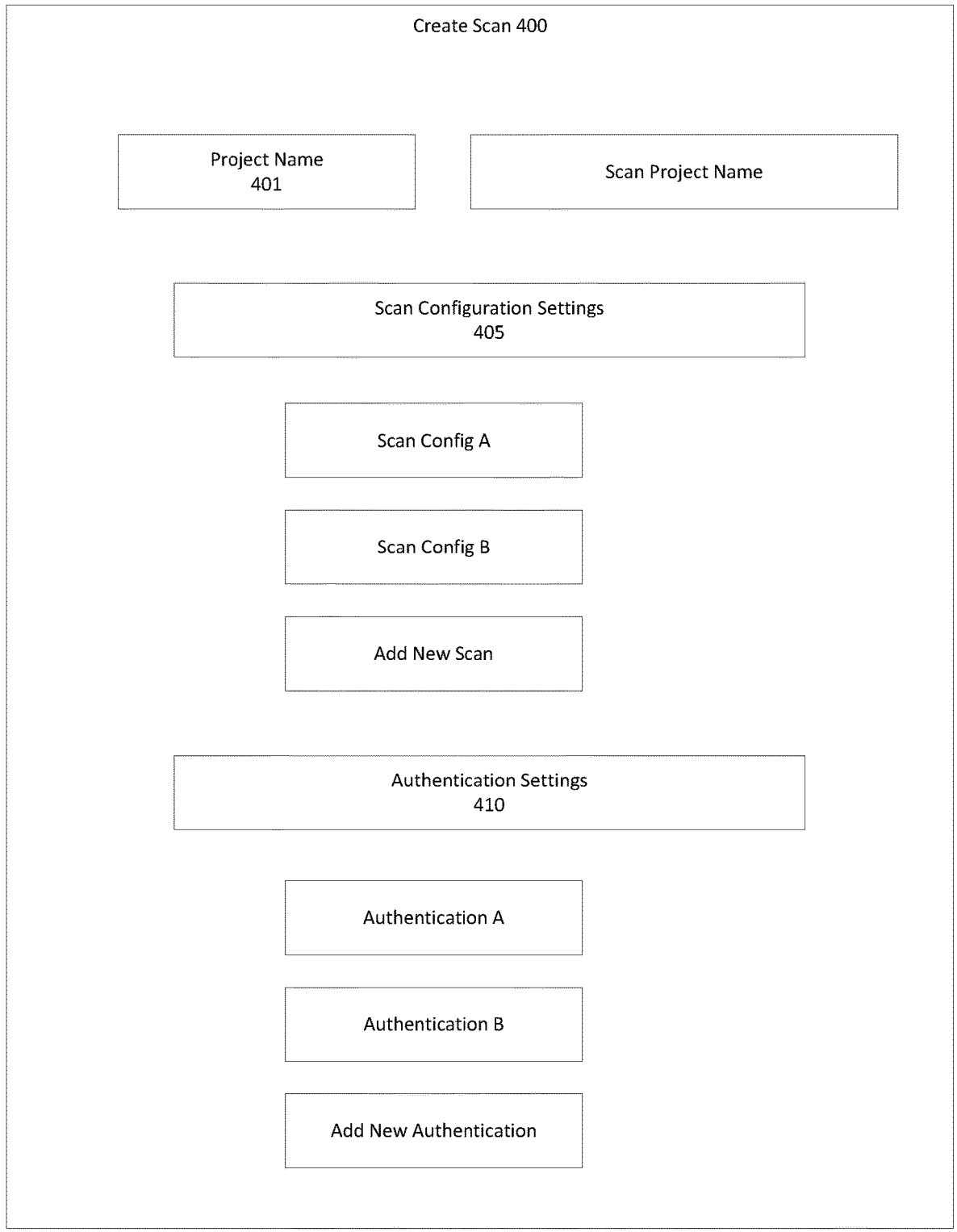
FIG. 4 shows a screenshot of an exemplary user portal, in accordance with an embodiment.

FIG. 4 shows a screenshot of an exemplary user portal, in accordance with an embodiment.

In accordance with an embodiment, the user portal shown in the figure shows a page 400 where a user can create (or modify an existing) scan project. The scan project can comprise a project name 401, as well as a selection of scanners 405 to be used. These scanners can ach have their own configuration settings, such as scan config A, scan config B . . . etc. In addition, a user can be prompted to add a new scan to the project, whether that be a newly created project, or a modification to an existing project.

In accordance with an embodiment, the scan can additionally be associated with/comprise a number of authentications (e.g., authentication tokens) via the authentication settings 410. Each of the authentications, such as authentication A and authentication B, can comprise a type of an authentication as well as authentication credentials. A user can additionally be prompted to add a new authentication to the scan project.

In accordance with an embodiment, this page can also be used to modify existing scan projects.

Figure 5:
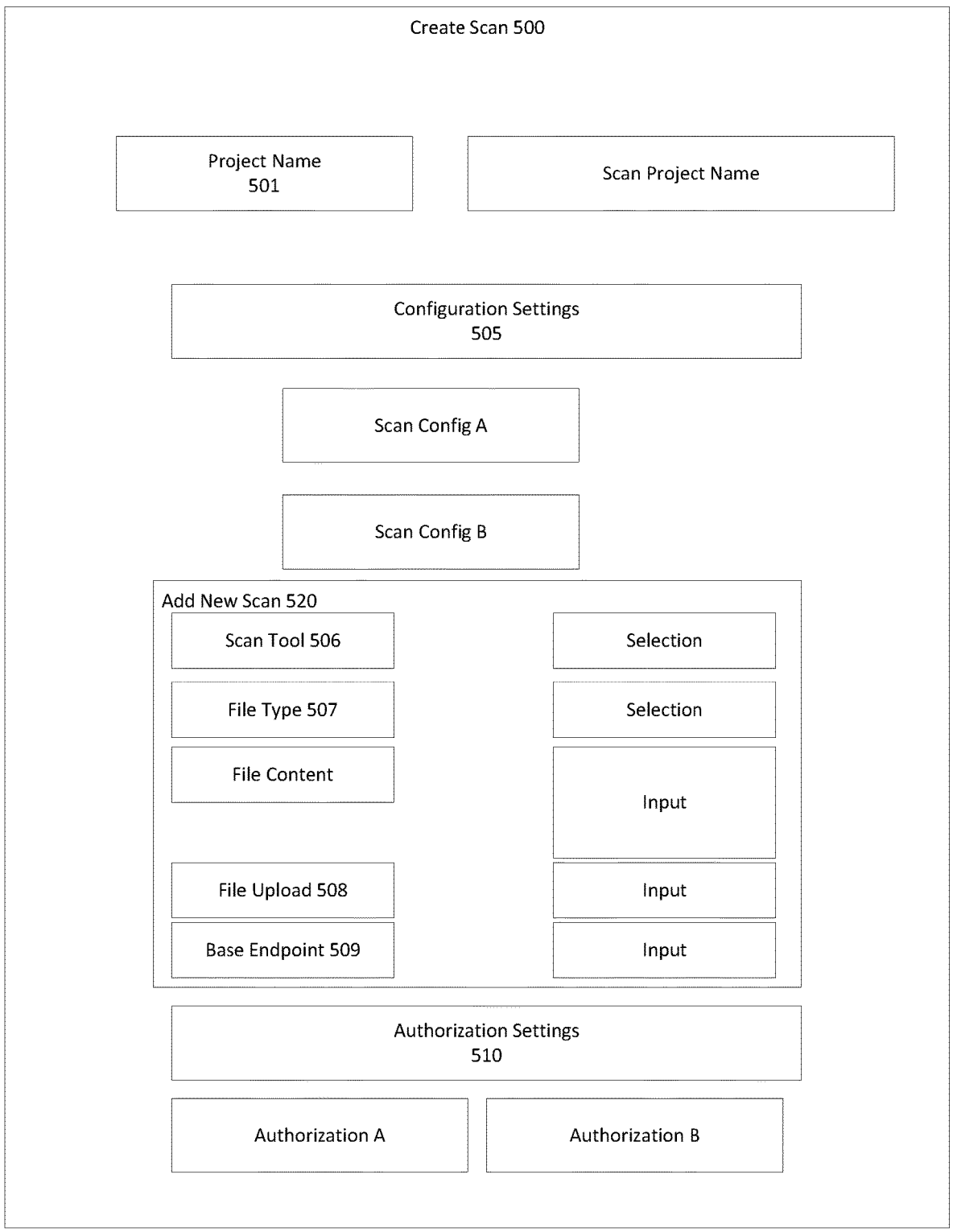
FIG. 5 shows a screenshot of an exemplary user portal, in accordance with an embodiment.

FIG. 5 shows a screenshot of an exemplary user portal, in accordance with an embodiment.

In accordance with an embodiment, the user portal shown in the figure shows a page 500 where a user can create a scan project. The scan project can comprise a project name 501, as well as a selection of scanners 505 to be used. The project can also comprise authentication configurations 510.

In accordance with an embodiment, a new scan 520 can be added to the scan configuration. The new scan can present options for a scan tool 506, and a file type 507, along with file content. In addition, an upload path 508 can be inputted, and a base endpoint 509 at which the scan should be directed can be configured.

In accordance with an embodiment, this page can also be used to modify existing scan projects.

Figure 6:
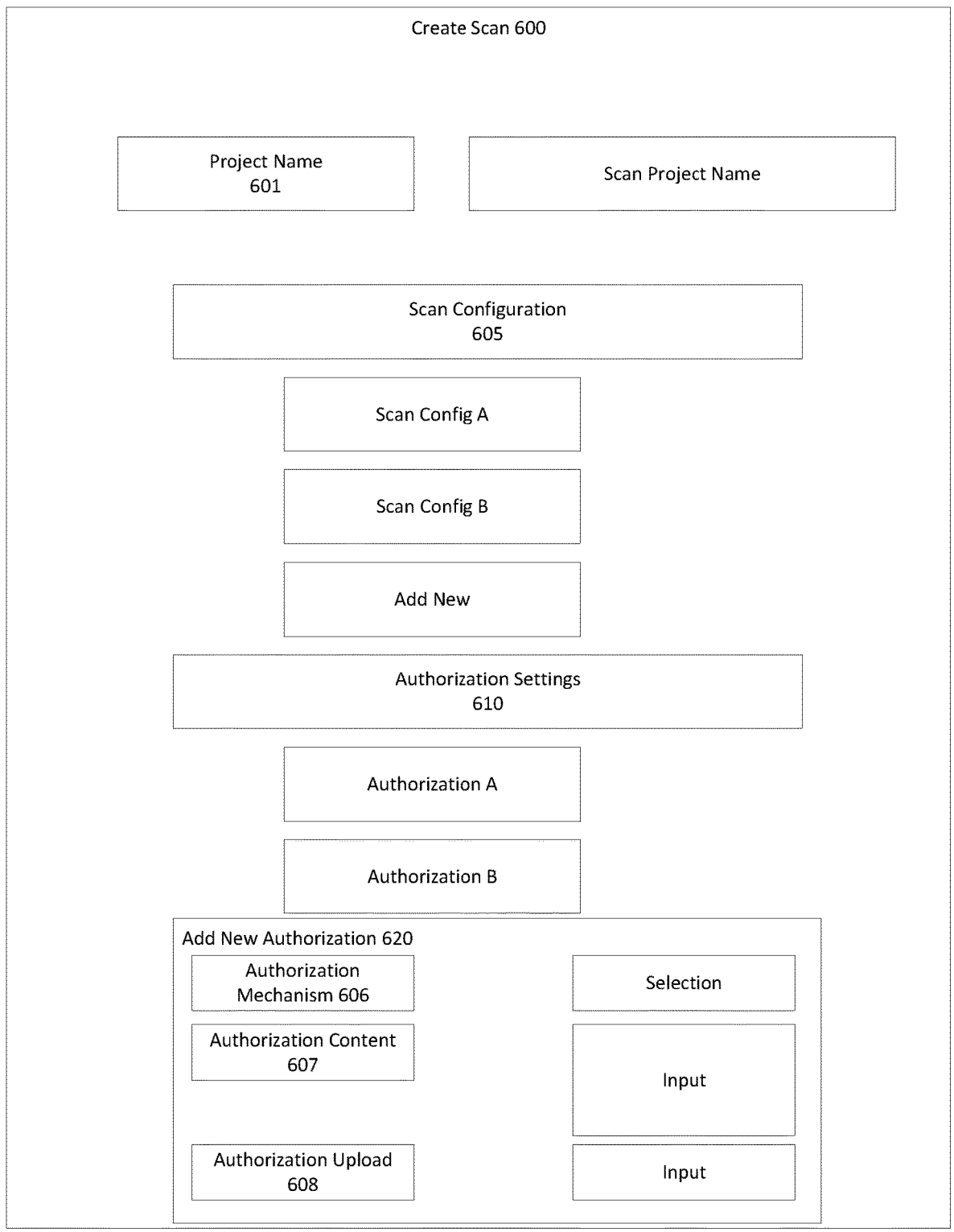
FIG. 6 shows a screenshot of an exemplary user portal, in accordance with an embodiment.

FIG. 6 shows a screenshot of an exemplary user portal, in accordance with an embodiment.

In accordance with an embodiment, the user portal shown in the figure shows a page where a user can create a scan project. The scan project can comprise a project name 600, as well as a selection of scanners 605 to be used. The project can also comprise authentication configurations 610.

In accordance with an embodiment, a new authentication configuration 620 can be added to/amended on a scan project. The authentication configuration can comprise an authentication mechanism 606, the content of the authentication 607, and an authentication upload path 608 where a user can provide, for example, authentication credentials to be uploaded from.

In accordance with an embodiment, this page can also be used to modify existing scan projects.

FIG. 7 shows a screenshot of an exemplary user portal, in accordance with an embodiment.

In accordance with an embodiment, the user portal shown in the figure shows scan job status page 700 where a user view the scan jobs that are active, queued, or archived. The scan projects can comprise a project name 703, the endpoint at which the scans are directed 705. The page can additionally show the status 710 of each of the scan projects.

Protected Proxy Redirector

Existing API scanners generally utilize a proxy-forward mechanism when performing API scans. When a client request comes in, such scanners can be re-directed in a way that involves a mapping of the scan directly to the endpoint. These scanners take the scan job, rewrite some of the headers, and then forward this on directly to the end point. However, this is, in general, not a secure method of handling such scans. Forwarding such scan packets directly to a public production endpoint can potentially expose vulnerabilities and/or crash websites or other web services (as some of the API scanners are designed to, for example, test for denial of service attacks).

In accordance with an embodiment, the presently disclosed proxy redirector has several advantages versus existing proxy services. In accordance with an embodiment, before the IQ service starts a containerized scanner, the IQ service can call the redirect service to setup a new redirector. As an example, supposed a scan job is attempting to scan a publicly accessible endpoint of a website. The scan job comprises the correct authentication, such as mutual transport layer security (mTLS) authentication credentials and also can specify a throttling parameter. Then, the redirector service creates a new ID, such as a UUID (universally unique identifier, for the endpoint that is the target of the scan, and then starts the actual web client to the endpoint. The IQ service can, having the created UUID, when it starts the containerized (imaged) scanner, add an IP address for the UUID to the DASS-redirector, and then change the scanning file to wherever the original address is located, use the UUID instead. Thus the scanners do not know there is a man-in-the-middle is occurring. Instead, the scanners operate on the assumption that the uuid.dass.local is the actual endpoint. When the call goes to the redirector service, the re-director looks up the uuid.dass.local for the public endpoint, this is where a traditional proxy would just copy the request and forward the request on. However, what the redirector service does instead is to create a new connection to the client as if the redirector service is client itself. Then, the redirector can take the headers and data that came from containerized scanner, copy them and paste them to the new client that is created. This can be thought of as mirroring the connection instead of forwarding it. The mirror is maintained on the return as well back to the containerized scanner.

In accordance with an embodiment, the present disclosure provides a mechanism to effectively proxy and protect HTTP/TLS redirection attempts. This technique is a sub component of the Dynamic API Scanning Service and breaks from standard patterns and is how the abstraction from the security scanners is accomplished. The resulting scanner is unaware that a man-in-the-middle is present. Furthermore, this technique mirrors the intended target request with a new request, never forwarding the original request from the scanner. This action provides protection to the end target as only key elements of the HTTP request are used while crafting a new HTTP request.

In accordance with an embodiment, the catalog of security scanners run inside the container service, from within the IQ service. These services can be unmodified, and be unware of the redirection in place. The provided abstraction enables quick adoption of new security scanners to the Dynamic API Scanning Service. When a scan is requested or scheduled for a user, the IQ service first requests a unique DNS (domain name system) entry for the target endpoint the user wishes to scan. Then on the startup of the security scanner's container (e.g., Docker container), a local DNS entry is added for the unique DNS entry provided by the proxy redirect service. This DNS entry resolves to the IP address of the redirect service's VIP (shared IP).

In accordance with an embodiment, security scanners in the service catalog operate off a configuration file, which contains details about the endpoint, including API paths and data types. This configuration file is modified to replace the actual target endpoint address with the DNS entry created by the redirect service. When the scanner starts up, it is unaware of any changes and starts scanning the DNS entry, which is actually the redirect service. When the incoming HTTP packet is found on the redirector, it is compared to a map which correlates DNS entries to actual target endpoints. The scanner's HTTP request is kept open, while a new HTTP request is created. This new request uses a certificate acquired from the PKI-OTP service, which is signed by a service CA the end users must trust in their endpoint's mTLS configuration. Key headers and body data from the scanner's request are copied into the new request before sending to the target endpoint. At this point in time, the redirector is actually performing the scan on behalf of the security scanner. Any responses back from the target endpoint are copied to the original scanner's HTTP request. Once this round trip transaction is completed, the scanner is unaware that there was a redirect service in-between it and the target endpoint.

Figure 8:
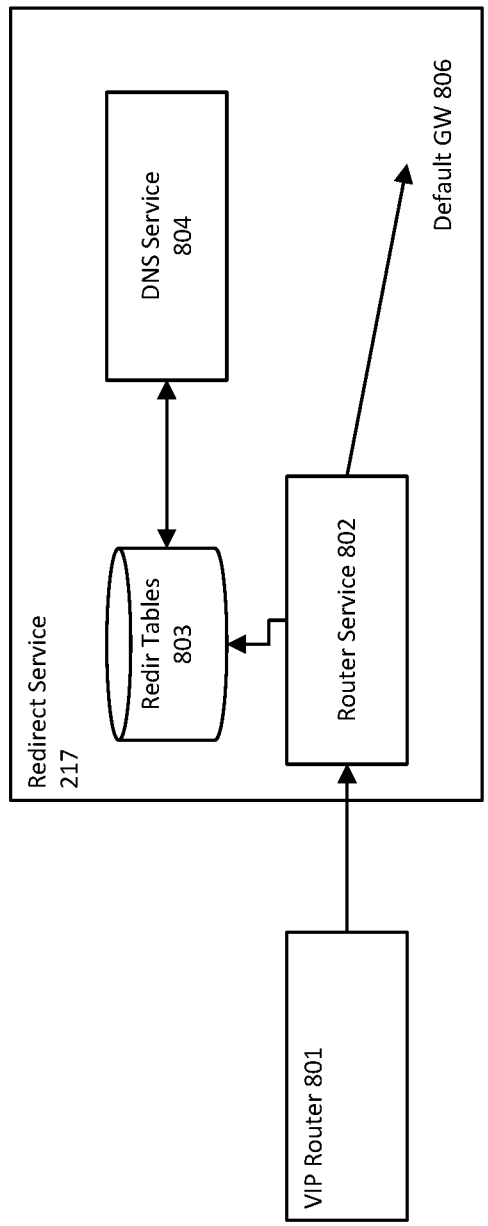
FIG. 8 shows an exemplary redirect service used in a dynamic API scanning system, in accordance with an embodiment.

FIG. 8 shows an exemplary redirect service used in a dynamic API scanning system, in accordance with an embodiment.

In accordance with an embodiment, the redirect service 217 can receive, from a virtual IP router 801, the scan request job. The redirect service 217 can comprise a router service 802, one or more redirect table 803, and a DNS service 804. The router service can direct outgoing calls via a default gateway 806.

In accordance with an embodiment, security scanners in the service catalog operate off a configuration file, which contains details about the endpoint as specified in the scan job request, including API paths and data types. This configuration file is then modified to replace the actual target endpoint address with the DNS entry created by the redirect service (e.g., by the DNS service 804). When the scanner starts up, it is unaware of any changes and starts scanning the DNS entry, which is actually the redirect service. When the incoming HTTP packet is found on the redirector, it is compared to a map which correlates DNS entries to actual target endpoints (e.g., at the redirect table 803). The scanner's HTTP request is kept open, while a new HTTP request is created. This new request uses a certificate acquired from the PKI-OTP service, which is signed by a service CA the end users must trust in their endpoint's mTLS configuration. Key headers and body data from the scanner's request are copied into the new request before sending to the target endpoint. At this point, the redirector is actually performing the scan on behalf of the security scanner, via the router service 802. Any responses back from the target endpoint are copied to the original scanner's HTTP request, again via the router service 802. Once this round trip transaction is completed, the scanner is unaware that there was a redirect service in-between it and the target endpoint.

Figure 9:
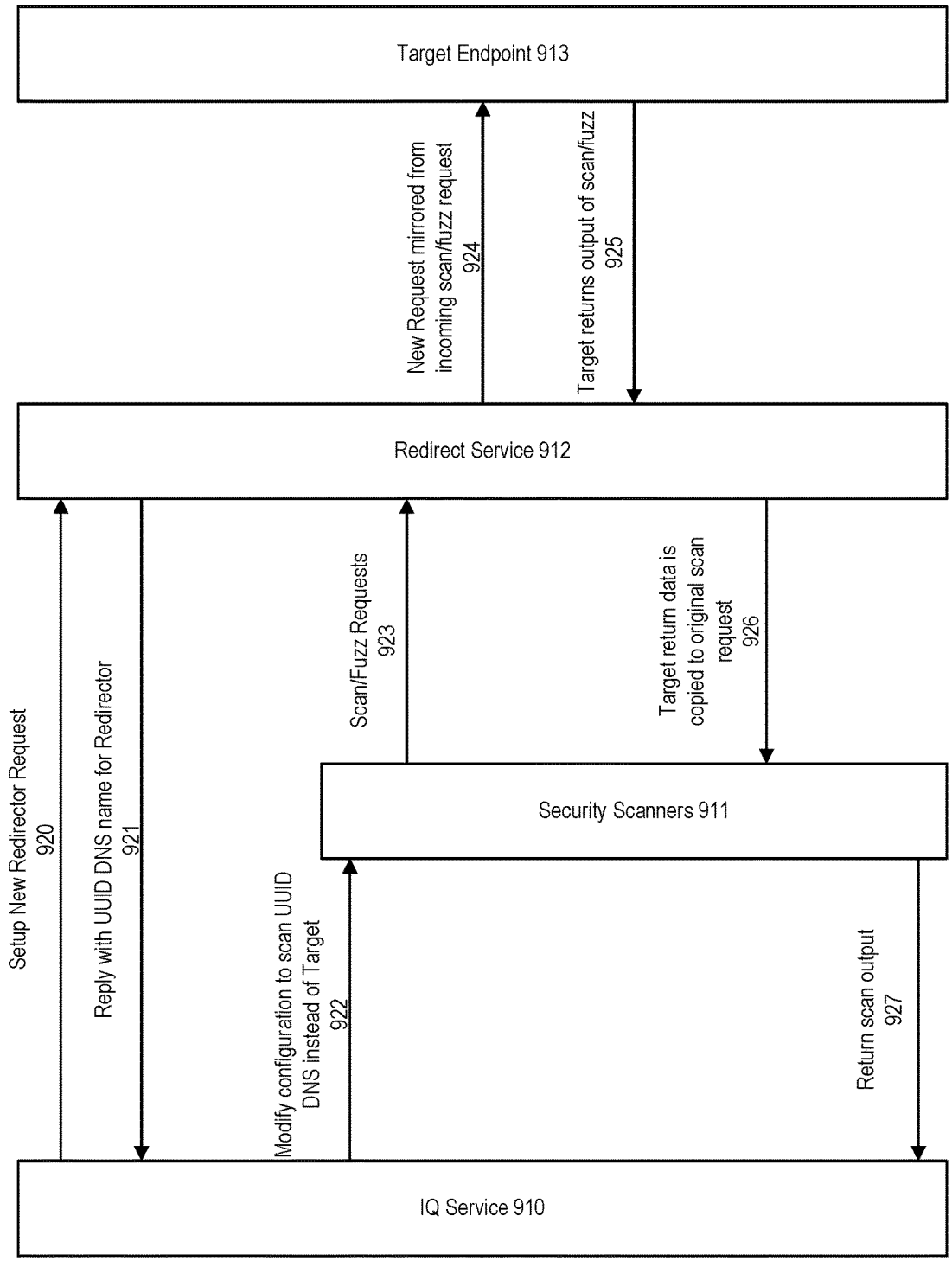
FIG. 9 shows a flowchart of a redirect service used in a dynamic API scanning system, in accordance with an embodiment.

FIG. 9 shows a flowchart of a redirect service used in a dynamic API scanning system, in accordance with an embodiment.

In accordance with an embodiment, after receiving/retrieving a scan request, an IQ service 910 can setup a new redirector request 920 at the redirect service 912. The redirect service can create a new UUID for the request and reply to the IQ service with the UUID DNS name for the redirector 921. The IQ service, with this new UUID, can modify 922 a configuration of one or more security scanners 911 to scan the UUID created by the redirect service instead of scanning the target endpoint 913.

In accordance with an embodiment, then, as the security scanner 911 is targeted at the UUID of the redirect service 912, the scanner can send the scan/fuzz requests 923 to the redirect service. The redirect service can then, at 924, send new requests mirrored from the incoming scan/fuzz request to the target endpoint 913, such that the original scan/fuzz requests from the scanner are never directly sent to the target endpoint.

In accordance with an embodiment, at 924, when incoming HTTP requests are made to the redirect service, the DNS entry used is checked against a key-value map. This provides the redirect service with the name of the actual target endpoint. A common pattern in the industry is to rewrite HTTP headers and simply forward the packet to the target endpoint. The risk in forwarding a rewritten HTTP packet is that there is no control over the packet any more, nor is the data normalized from the client scanner. Creating a new HTTP request at the redirect service allows for greater control and security of the transaction, as the service is not blindly forwarding packets. Any data desired to be removed or added to this new request is trivial. This technique allows for more advanced redirection techniques, such as mTLS or cavage HTTP signing. Additionally, as the callers are security scanners that utilize SQL injection, resource overallocation and other various attack techniques, having a mechanism that can normalize or otherwise filter and prevent certain attacks from being forwarded helps protect the target endpoints. These endpoints are live endpoints for users, and it is not desirable or safe to allow security scanners to uncontrollably scan these endpoints. By creating a new request instead of forwarding an existing request, the redirect service adds this level of stability and abstraction to the target endpoint.

In accordance with an embodiment, the target endpoint can return 925 the outputs of the scan/fuzz requests. At 926, the data returned from the target endpoint to the redirect service is copied to the original scan request. When the target endpoint returns from the redirect services' call, any data collected will be copied to the original scanner's HTTP request. The inverse mapping is made, correlating a target endpoint to a DNS entry. This scanner HTTP request is still held open, so a match is found. Any scan body data or headers are copied to this original request, and then sent back to the scanner that sent the request. At this point, the scanner is unaware of the actual target endpoint and only knows about the DNS entry it was given to scan.

In accordance with an embodiment, then, the scan outputs are returned 927 to the IQ service. The IQ service, then, as described above, can output the data through an ETL process to produce a normalized, and easy to read/understand, results page/summary for the client to view.

Figure 10:
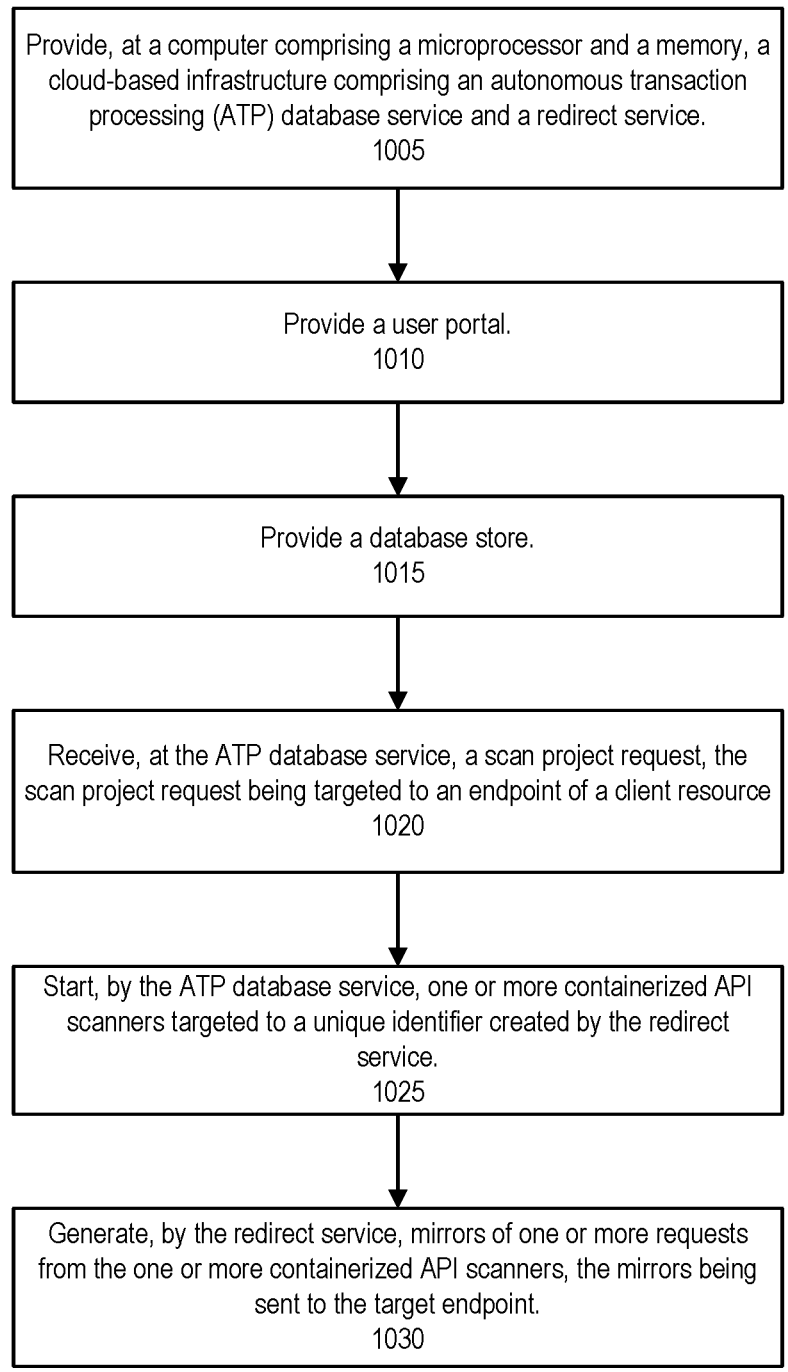
FIG. 10 shows a flow chart of a method for providing a protected proxy for a dynamic API scanning service, in accordance with an embodiment.

FIG. 10 shows a flow chart of a method for providing a protected proxy for a dynamic API scanning service, in accordance with an embodiment.

In accordance with an embodiment, at step 1005, the method can provide, at a computer comprising a microprocessor and a memory, a cloud-based infrastructure comprising an autonomous transaction processing (ATP) database service and a redirect service.

In accordance with an embodiment, at step 1010, the method can provide a user portal.

In accordance with an embodiment, at step 1015, the method can provide a database store.

In accordance with an embodiment, at step 1020, the method can receive, at the ATP database service, a scan project request, the scan project request being targeted to an endpoint of a client resource.

In accordance with an embodiment, at step 1025, the method can start, by the ATP database service, one or more containerized API scanners targeted to a unique identifier created by the redirect service.

In accordance with an embodiment, at step 1030, the method can generate, by the redirect service, mirrors of one or more requests from the one or more containerized API scanners, the mirrors being sent to the target endpoint.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application program code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for a protected proxy for a dynamic API scanning service, comprising:
   a computer comprising one or more microprocessors;
   a cloud-based infrastructure provided at the computer, the cloud-based infrastructure comprising an autonomous transaction processing (ATP) database service and a redirect service, the redirect service comprising a router service, one or more redirect tables, and a domain name system (DNS) service;
   a user portal; and
   a database store;
   wherein the ATP database service receives a scan project request, the scan project request being targeted to an endpoint of a client resource;
   wherein the ATP database service starts one or more containerized application programming interface (API) scanners targeted to a unique identifier created by the redirect service; and
   wherein the redirect service generates mirrors of one or more requests from the one or more containerized API scanners, the mirrors being sent to the target endpoint.

2. The system of claim 1, wherein the scan project request comprises one or more authentication tokens.

3. The system of claim 2,
   wherein the redirect service utilizes the one or more redirect tables in creating the unique identifier.

4. The system of claim 3,
   wherein the router service of the redirect service utilizes a default gateway for sending the mirrors to the target endpoint.

5. The system of claim 4;
   wherein responses to the mirrors sent to the target endpoint are received at the default gateway of the redirect service; and
   wherein upon the responses being received at the default gateway of the redirect service, the responses are forwarded to the scan project request, wherein said scan project request is kept open during by the ATP database service.

6. The system of claim 1,
   wherein generating the mirrors of the one or more requests from the one or more containerized API scanners comprises
      copying key headers of the one or more requests from the one or more containerized API scanners to the mirrors; and
      copying body data of the one or more requests from the one or more containerized API scanners to the mirrors.

7. A method for a protected proxy for a dynamic API scanning service, comprising:
   providing, at a computer comprising a microprocessor and a memory, a cloud-based infrastructure comprising an autonomous transaction processing (ATP) database service and a redirect service, the redirect service comprising a router service, one or more redirect tables, and a domain name system (DNS) service;
   providing a user portal;
   providing a database store;
   receiving, at the ATP database service, a scan project request, the scan project request being targeted to an endpoint of a client resource;
   starting, by the ATP database service, one or more containerized application programming interface (API) scanners targeted to a unique identifier created by the redirect service; and
   generating, by the redirect service, mirrors of one or more requests from the one or more containerized API scanners, the mirrors being sent to the target endpoint.

8. The method of claim 7,
   wherein the scan project request comprises one or more authentication tokens.

9. The method of claim 8
   wherein the redirect service utilizes the one or more redirect tables in creating the unique identifier.

10. The method of claim 9,
wherein the router service of the redirect service utilizes a default gateway for sending the mirrors to the target endpoint.

11. The method of claim 10;
wherein responses to the mirrors sent to the target endpoint are received at the default gateway of the redirect service; and
wherein upon the responses being received at the default gateway of the redirect service, the responses are forwarded to the scan project request, wherein said scan project request is kept open during by the ATP database service.

12. The method of claim 7,
wherein generating the mirrors of the one or more requests from the one or more containerized API scanners comprises
copying key headers of the one or more requests from the one or more containerized API scanners to the mirrors; and
copying body data of the one or more requests from the one or more containerized API scanners to the mirrors.

13. A non-transitory computer readable storage medium having instructions thereon for a protected proxy for a dynamic API scanning service, which when read and executed by a computer cause the computer to perform steps comprising:
providing, at a computer comprising a microprocessor and a memory, a cloud-based infrastructure comprising an autonomous transaction processing (ATP) database service and a redirect service, the redirect service comprising a router service, one or more redirect tables, and a domain name system (DNS) service;
providing a user portal;
providing a database store;
receiving, at the ATP database service, a scan project request, the scan project request being targeted to an endpoint of a client resource;
starting, by the ATP database service, one or more containerized application programming interface (API) scanners targeted to a unique identifier created by the redirect service; and
generating, by the redirect service, mirrors of one or more requests from the one or more containerized API scanners, the mirrors being sent to the target endpoint.

14. The non-transitory computer readable storage medium having of claim 13,
wherein the scan project request comprises one or more authentication tokens.

15. The non-transitory computer readable storage medium having of claim 14,
wherein the redirect service utilizes the one or more redirect tables in creating the unique identifier.

16. The non-transitory computer readable storage medium having of claim 15,
wherein the router service of the redirect service utilizes a default gateway for sending the mirrors to the target endpoint.

17. The non-transitory computer readable storage medium having of claim 16,
wherein responses to the mirrors sent to the target endpoint are received at the default gateway of the redirect service; and
wherein upon the responses being received at the default gateway of the redirect service, the responses are forwarded to the scan project request, wherein said scan project request is kept open during by the ATP database service.

* * * * *